(12) United States Patent
Cool

(10) Patent No.: US 10,288,317 B2
(45) Date of Patent: May 14, 2019

(54) FLOW CONTROLLER AND A HOT WATER APPLIANCE PROVIDED THEREWITH

(71) Applicant: Intergas Heating Assets, B.V., Coevorden (NL)

(72) Inventor: Peter Jan Cool, Lochem (NL)

(73) Assignee: Intergas Heating Assets, B.V., Coevorden (NL)

( * ) Notice: Subject to any disclaimer, the term of this patent is extended or adjusted under 35 U.S.C. 154(b) by 0 days.

(21) Appl. No.: 15/557,965

(22) PCT Filed: Mar. 21, 2016

(86) PCT No.: PCT/NL2016/050194
§ 371 (c)(1),
(2) Date: Sep. 13, 2017

(87) PCT Pub. No.: WO2016/190730
PCT Pub. Date: Dec. 1, 2016

(65) Prior Publication Data
US 2018/0058722 A1    Mar. 1, 2018

(30) Foreign Application Priority Data

Mar. 20, 2015 (NL) .................................. 2014498
Jul. 24, 2015 (NL) .................................. 2015218

(51) Int. Cl.
*F24H 9/20* (2006.01)
*F16K 11/044* (2006.01)
(Continued)

(52) U.S. Cl.
CPC .......... *F24H 9/2007* (2013.01); *F16K 11/044* (2013.01); *F24D 17/0078* (2013.01); *F24D 19/1009* (2013.01); *F24H 1/14* (2013.01)

(58) Field of Classification Search
CPC .................................. F24H 9/2007; F24H 1/14
See application file for complete search history.

(56) References Cited

U.S. PATENT DOCUMENTS 4,393,891 A * 7/1983 Snoek ....................... E03B 9/00
                                                    134/166 C
5,119,988 A   6/1992 Fiedrich
(Continued)

FOREIGN PATENT DOCUMENTS

DE    2557156 A1   6/1977
DE   29722208 U1   2/1998
(Continued)

OTHER PUBLICATIONS

International Search Report and Written Opinion dated Jul. 4, 2016 for PCT/NL2016/050194.

*Primary Examiner* — Nathaniel Herzfeld

(57) ABSTRACT

A flow controller for a hot water appliance includes a housing having at least three channels, a branching chamber arranged in the housing and in which the at least three channels debouch, and in which a shut-off valve is arranged with which at least two of the three channels can be closed and left clear. The shut-off valve has an adjustment range with a first extreme position in which a first channel and a second channel of the at least three channels are in flow connection with each other via the branching chamber and in which the first channel and a third channel of the at least three channels are substantially closed off from each other. A hot water appliance can include such a flow controller.

18 Claims, 6 Drawing Sheets

(51) Int. Cl.
*F24D 19/10* (2006.01)
*F24D 17/00* (2006.01)
*F24H 1/14* (2006.01)

(56) References Cited

U.S. PATENT DOCUMENTS

| | | | | |
|---|---|---|---|---|
| 5,181,656 | A * | 1/1993 | Schwerdt | F24D 19/1051 137/625.5 |
| 5,209,401 | A * | 5/1993 | Fiedrich | F24D 19/1033 137/872 |
| 5,588,088 | A * | 12/1996 | Flaman | F24D 17/00 122/14.3 |
| 5,701,387 | A * | 12/1997 | McGugan | F24D 17/0073 122/13.3 |
| 7,020,386 | B2 * | 3/2006 | Scime | F24F 1/00 392/441 |
| 7,298,968 | B1 * | 11/2007 | Boros | F24D 17/00 392/441 |
| 2009/0159017 | A1 * | 6/2009 | Tsuge | F24D 19/1051 122/14.1 |
| 2012/0024968 | A1 * | 2/2012 | Beyerle | G05D 23/1346 236/12.11 |
| 2012/0037095 | A1 * | 2/2012 | DuPlessis | F24D 19/1015 122/14.3 |
| 2013/0062422 | A1 * | 3/2013 | Marty | E03C 1/057 236/12.16 |
| 2014/0202549 | A1 * | 7/2014 | Hazzard | F24H 9/2007 137/3 |

FOREIGN PATENT DOCUMENTS

| | | |
|---|---|---|
| EP | 1321700 A2 | 6/2003 |
| EP | 1967935 A1 | 9/2008 |
| EP | 2628984 A1 | 8/2013 |
| JP | 54134334 U | 9/1979 |
| JP | H07-317927 A | 12/1995 |
| WO | 9825086 A1 | 6/1998 |
| WO | 2012118432 A1 | 9/2012 |

* cited by examiner

FLOW CONTROLLER AND A HOT WATER APPLIANCE PROVIDED THEREWITH The invention relates to a flow controller for a hot water appliance and to a hot water appliance, more particularly a high-power hot water appliance, provided with such a flow controller.

Such high-power hot water appliances are for instance applied to supply hot channel water to a tap in a kitchen or to provide hot water to showers. Depending on the field of application, the use of such (high-power) hot water appliances presents several challenges.

A first challenge arises when a user has drawn hot water from a tap for some time. As long as this water is drawn off substantially continuously and continues to flow, the temperature can be well controlled. When however the tap is temporarily turned off after hot water has been drawn off, the motionless hot water can reach undesirably high temperatures as a result of an equalization of the temperature in the water appliance and the motionless water in the heat exchanger. If hot water is drawn off again shortly thereafter, this water can have become so hot as to cause a risk of burn injury if it comes into contact with the skin of a user. In order to avoid this risk conventional hot water appliances are also equipped with a bypass channel with which cold water can be admixed to the hot water that has been motionless for some time.

A second challenge arises when there is a wide fluctuation in hot water requirement, for instance when a plurality of showers are combined as in sports centres and swimming pools. Depending on the shower use of an individual or a whole team simultaneously, the desired draw-off of hot water can fluctuate widely. In order to be able to meet the periodically great demand hot water appliances for such facilities are cascaded, i.e. connected to each other in a parallel circuit. According to the requirement, one or more hot water appliances are coupled or uncoupled by means of shut-off valves.

There is a continuous need to improve the reliability of hot water appliances and to moreover give them a simpler and more compact form.

The invention now has for its object to provide a flow controller and a hot water appliance of the above described type provided therewith which overcomes at least one of the stated challenges.

The stated objective is achieved according to the invention with a flow controller for a hot water appliance, comprising:
a housing comprising at least three channels;
a branching chamber which is arranged in the housing and in which the at least three channels debouch and in which a shut-off valve is arranged with which at least two of the three channels can be closed and left clear; and
wherein the shut-off valve has an adjustment range with a first extreme position in which a first channel and a second channel of the at least three channels are in flow connection with each other via the branching chamber and in which the first channel and a third channel of the at least three channels are substantially closed off from each other.

When in the case of such a flow controller the shut-off valve is moved away from the first extreme position, the closure between the first and third channels is gradually opened, whereby fluid can flow via the branching chamber into the third channel. The flow controller can hereby allow selective flow of fluid via the third channel while the first and second channels can remain in flow connection with each other via the branching chamber.

Provided with these measures is a flow controller which can temporarily guide a part of the fluid via a bypass conduit. The first challenge stated in the introduction, of preventing water being heated so that it becomes too hot, can hereby be overcome.

According to a preferred embodiment, the shut-off valve lies in the first extreme position against the wall of the branching chamber and closes off the third channel from the branching chamber, while a fluid can however flow via the branching chamber from the first channel to the second channel, or vice versa. By having the shut-off valve lie against the wall of the branching chamber the third channel is on the one hand effectively closed while throughflow of fluid from the first channel via the branching chamber to the second channel, or vice versa, can take place substantially unobstructed.

According to a further preferred embodiment, the shut-off valve comprises two sealing sides, wherein:
in the first extreme position of the adjustment range of the shut-off valve a first sealing side of the shut-off valve lies against the wall of the branching chamber and closes off the third channel from the branching chamber; and
in a second extreme position of the adjustment range of the shut-off valve a second sealing side of the shut-off valve lies against the wall of the branching chamber and closes off the first channel from the branching chamber, whereby the supply of fluid via the first channel to the branching chamber is substantially blocked.

By providing the shut-off valve with two sealing sides, each configured to provide a seal in an associated extreme position, two opposite outflows of channels, an outflow of the first channel and an outflow of the third channel respectively, can be closed off from the branching chamber with one shut-off valve.

Provided with these measures is a flow controller which in the second extreme position can temporarily block a supply of fluid via the first channel. The flow controller can hereby temporarily uncouple a hot water appliance from a parallel circuit, this providing a solution to the second challenge stated in the introduction. It is noted that the flow controller according to this embodiment with a single shut-off valve provides a solution to the first and second challenges stated in the introduction, while at least two separate shut-off valves were necessary for this purpose in the prior art.

This embodiment moreover provides a greatly simplified control: the channels are opened and closed in predictable manner by moving the shut-off valve at a predetermined speed from the one extreme position to the other extreme position. From the second extreme position to the first extreme position the bypass conduit is only opened temporarily and it is possible to determine in advance how much fluid is admitted via the third channel to the bypass conduit. A desired characteristic for the throughflow can be achieved with the design of the channel around the shut-off valve.

According to yet another preferred embodiment, the first, second and third channels are at least largely, more preferably substantially fully closable in the second extreme position of the adjustment range of the shut-off valve.

In some applications some leakage flow may continue between the first channel and the second channel, and this can even be desirable. In the case of a parallel circuit of two hot water appliances a small leakage flow of cold water through a first—at that moment not heating—hot water appliance can thus be easily compensated by having a second hot water appliance heat the water slightly more so that the mixture from the hot water appliances in parallel connection supplies water at the desired water temperature. By maintaining a small leakage flow large pressure differences, which exert load on the shut-off valve and other parts, can be prevented. It therefore suffices for some applications that the throughflow between the first and second channels can be at least greatly reduced, or 'constricted'.

For other applications it may be desirable for the first, second and third channel to be substantially fully closable with the shut-off valve. Because a 'constricted' position can likewise be set therewith, this embodiment which can achieve full closure is recommended.

According to yet another preferred embodiment, the shut-off valve moves in the branching chamber between the first and second extreme positions substantially transversely of the outflow of the second channel, and this outflow of the second channel into the branching chamber is left clear by the shut-off valve. With its two sealing sides the shut-off valve can hereby close off two opposite outflows of channels, an outflow of the first channel and an outflow of the third channel respectively, from the branching chamber while the second channel remains in connection with the branching chamber over this adjustment range.

According to yet another preferred embodiment of the flow controller, the first, second and third channels are brought into flow connection with each other over a first part of the adjustment range during movement thereover from the second extreme position in the direction of the first extreme position, and their relative flow via the branching chamber is increased over the adjustment range away from the second extreme position. The throughflow between the first channel and the second channel is hereby controllable and can be reduced, or 'constricted', when required. In the case of a high pre-pressure of the water it is thus possible to prevent so rapid a flow through the appliance that the outflow temperature desired by the user cannot be achieved. By reducing the throughflow in such a case it is possible to guarantee that the desired outflow temperature of the water is attainable. A sub-flow of fluid simultaneously also runs via the branching chamber to the third channel.

According to yet another preferred embodiment of the flow controller, the first, second and third channels are in flow connection with each other over a second part of the adjustment range and the throughflow via the branching chamber between the first and the second channel is further increased over the further adjustment range in the direction of the first extreme position, while the throughflow via the branching chamber between the first and the third channel is decreased over the further adjustment range in the direction of the first extreme position. The throughflow between the first channel and the second channel is hereby further controllable, while on the other hand the flow of fluid from the branching chamber to the third channel in the second part of the adjustment range can be reduced, and even fully closed off.

It is particularly advantageous according to yet another preferred embodiment that the transition between the first part of the adjustment range and the second part of the adjustment range lies in the range of 35%-65%, and more preferably in the range 40%-60% of the adjustment range of the shut-off valve. As the heat exchanger becomes more powerful, it will also be desirable to be able to supply more cold water via the bypass conduit. A bypass in the above stated range is sufficient for the most common (high-power) hot water appliances.

According to yet another preferred embodiment, the volume flow from the first channel is divided at the transition between the first part of the adjustment range and the second part of the adjustment range substantially proportionally over the second and the third channel.

When the shut-off valve of the flow controller according to yet another preferred embodiment is adjustable via a drivable screw spindle, a reliable and properly controllable system is obtained. The screw spindle is provided with a pitch and, in combination with the rotatable driving of the spindle, an accurate movement of the shut-off valve can be realized. The driving can for instance take place with an electric motor, more particularly with a stepping motor.

Although a plastic of high-grade quality can suffice, the shut-off valve is manufactured according to yet another preferred embodiment from a corrosion-resistant metal, more preferably from brass.

The invention further relates to a hot water appliance, comprising:

a heat exchanger with an inlet channel and an outlet channel;

a flow controller as described in the foregoing;

wherein the first channel is a feed channel;

wherein the second channel is a first discharge channel which is in flow connection with the inlet channel of the heat exchanger; and wherein the third channel is a second discharge channel which is in flow connection with a bypass channel; and wherein the bypass channel is in flow connection with the outlet channel of the heat exchanger so that, depending on a position of the shut-off valve in the branching chamber of the flow controller, water from the outlet channel of the heat exchanger and the bypass channel is mixable and dischargeable in mixed state via a water outflow of the hot water appliance.

Although the heat of the heat exchanger can have via temperature changes an adverse effect on the temperature changes on the sealing of the shut-off valve of the flow controller, and more limescale formation will moreover take place on the hot side, it is nevertheless possible to envisage that for specific applications the flow controller will be mounted on the hot side of the heat exchanger. Because the flow controller is located closer to the outlet of the heat exchanger, the cold water need cover less distance and a direct control can therefore be realized. It is noted that the branching chamber functions here as mixing chamber. According to an alternative embodiment, the invention therefore also relates to a hot water appliance comprising:

a heat exchanger with an inlet channel and an outlet channel;

a flow controller as specified in the foregoing;

wherein the first channel is a discharge channel;

wherein the second channel is a feed channel which is in flow connection with the outlet channel of the heat exchanger; and wherein the third channel is a feed channel which is in flow connection with a bypass channel; and wherein via the flow controller the bypass channel is in flow connection with the outlet channel of the heat exchanger so that, depending on a position of the shut-off valve of the flow controller, water from the outlet channel of the heat exchanger and the bypass channel is mixable in the branching chamber and dischargeable in mixed state via a water outflow of the hot water appliance.

According to yet another preferred embodiment, the hot water appliance further comprises at least one temperature sensor for determining the temperature of the water leaving the heat exchanger, and an electronic controller configured to drive the shut-off valve subject to the water temperature using a drive means, more particularly an electric motor.

Preferred embodiments of the present invention are further elucidated in the following description with reference to the drawing, in which.

Figure 1:
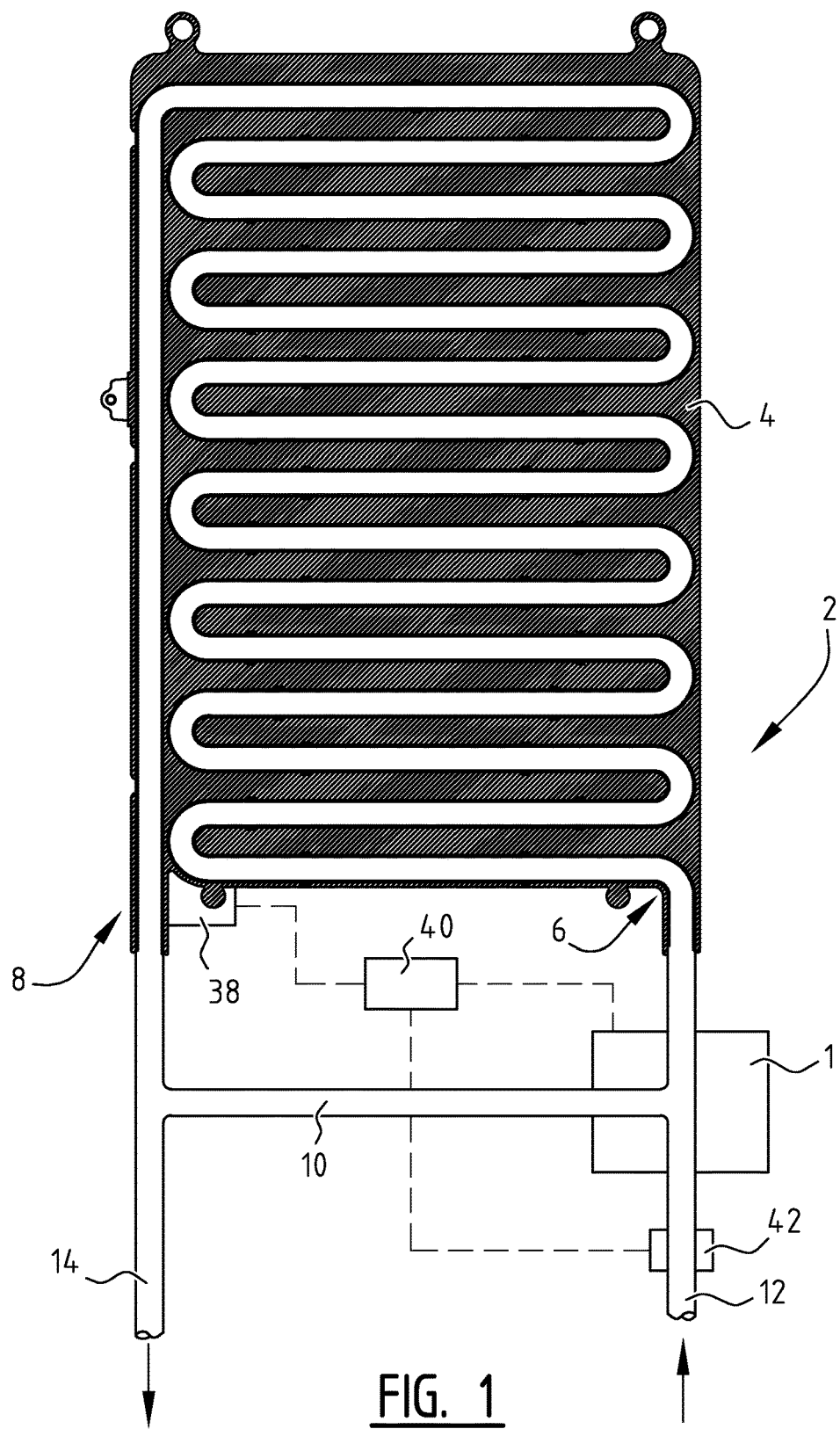
FIG. 1 is a schematic view of a hot water appliance with a flow controller according to the invention.

Hot water appliance 2 shown in FIG. 1 comprises a heat exchanger 4 with an inlet channel 6 for water to be heated and an outlet channel 8 with which heated water is discharged. As long as hot water is drawn substantially continuously from hot water appliance 2 and continues to flow, the temperature of this water can be properly controlled. However, when there is an interruption in delivery, the motionless hot water in heat exchanger 4 can reach undesirably high temperatures. If hot water is drawn off again shortly thereafter, this water can have become so hot that it causes a risk of burn injury when it comes into contact with the skin of a user.

Hot water appliance 2 according to the invention is provided with a bypass channel 10 with which cold water can be guided directly to outlet channel 8 of hot water appliance 2. This cold water can be admixed here to hot water coming from hot water appliance 2. When there is an interruption in delivery of hot water, cold water can thus be briefly admixed to the hot water in outlet channel 8, thereby preventing this water from being delivered at an undesirably high temperature to a user. Such a bypass channel 10 is per se known from the prior art, but the invention provides a particularly advantageous flow controller 1, which in the shown embodiment is arranged on the cold water side in cold water feed 12 of hot water appliance 2. Bypass channel 10 is coupled to outlet channel 8 of the heat exchanger and the mixed water can be discharged via hot water discharge 14 of hot water appliance 2 to a water consumer, such as a shower or tap.

The temperature can be determined by arranging a temperature sensor 38 close to the hot water side of heat exchanger 4, for instance at the position of discharge 14. An electronic controller 40 then controls a shut-off valve 26 in flow controller 1 subject to the measured temperature, whereby control can take place by means of feedback. The advantage of a feedback control is that (almost) no model-based knowledge of the overall system is required. As a result the exact characteristic of the shut-off valve is not critical.

An alternative embodiment (not shown) comprises a temperature sensor arranged in cold water feed 12. With this temperature sensor changes in the temperature of the water supplied via cold water feed 12 can be measured and on the basis hereof the electronic controller 40 can compensate in advance via a feed-forward control.

Particularly advantageous is that hot water appliance 2 according to a further preferred embodiment is provided with a flow sensor 42 with which the desired flow is sensed (and so also switch-on or switch-off). The flow and the temperature difference over hot water appliance 2 are parameters for the load, on the basis of which electronic controller 40 can optimally control the combustion process in hot water appliance 2. The cold water temperature and the desired hot water temperature do after all determine the net power to be generated. When the losses to be expected, such as heat loss to the surrounding area and efficiency losses of the exchanger, are known, the electronic controller can determine the optimal settings.

Figure 2:
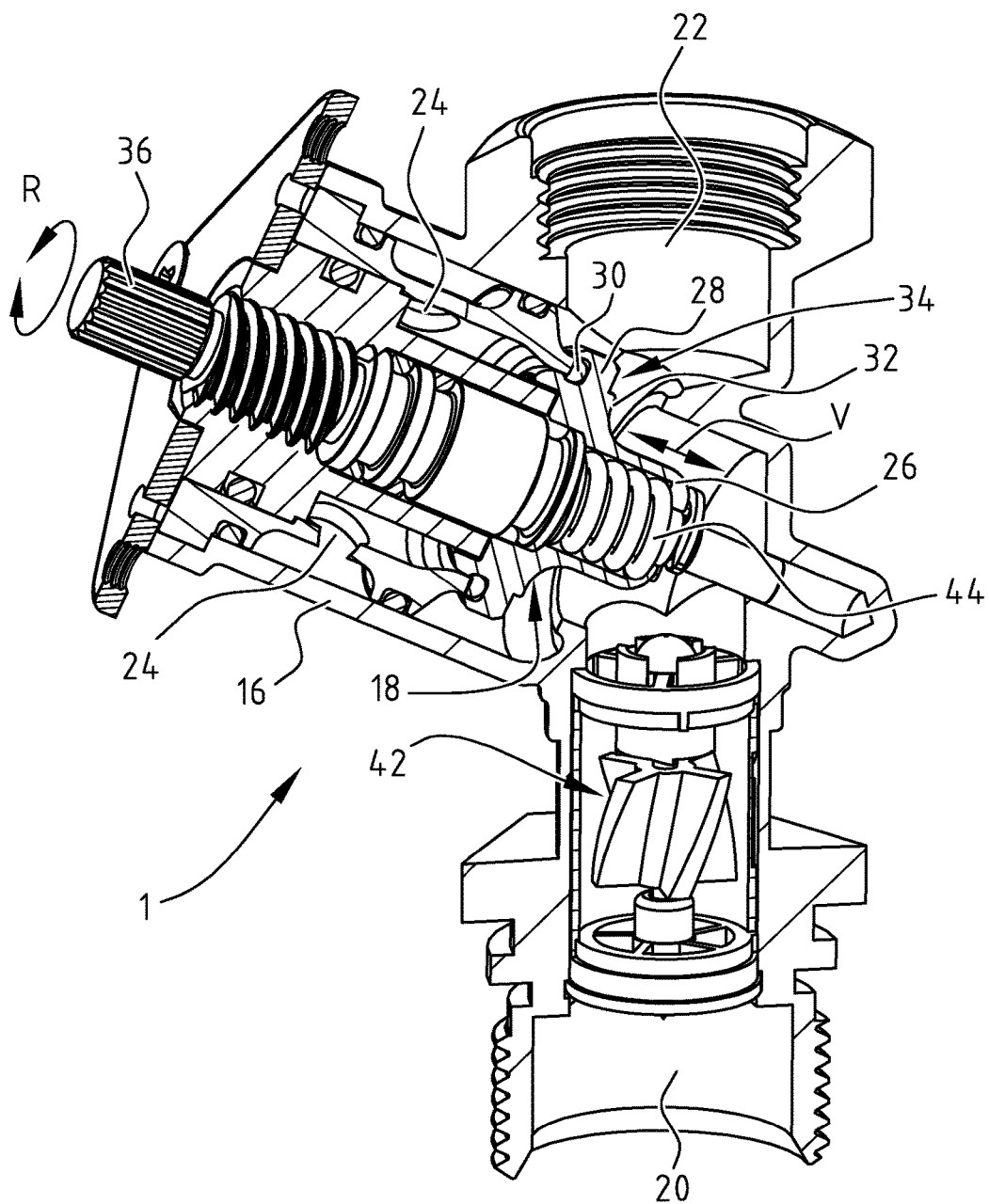
FIG. 2 is a cross-sectional view of a flow controller according to the invention, wherein the shut-off valve is in a first extreme position.

In the cross-sectional view of FIG. 2 flow controller 1 is shown in a first extreme position of shut-off valve 26. Flow controller 1 has a housing 16 in which are arranged a first channel 20, a second channel 22 and a third channel 24 which all debouch in a common branching chamber 18. In the shown first extreme position the shut-off valve 26 lies with a first side 28 thereof against a wall of branching chamber 18 and thereby closes off third channel 24 from branching chamber 18. At the same time fluid, in particular water, can flow freely from first channel 20 via branching chamber 18 to second channel 22, or vice versa.

In the shown embodiment first channel 20 is a feed channel and second channel 22 is a first discharge channel which is in flow connection via branching chamber 18 with inlet channel 6 of heat exchanger 4. Third channel 24 is a second discharge channel which is in flow connection with a bypass channel 10, wherein bypass channel 10 is in flow connection with outlet channel 8 of heat exchanger 4 so that, depending on a position of shut-off valve 26 in branching chamber 18 of flow controller 1, water from outlet channel 8 of heat exchanger 4 and bypass channel 10 are mixable and dischargeable in mixed state via a water discharge 14 of hot water appliance 2.

Shut-off valve 26 further has a second side 32 with which shut-off valve 26 is arrangeable in a closing manner against the wall of branching chamber 18 such that the outflow of first channel 22 is closed off from branching chamber 18. In order to improve the closure the first side 28 is provided with a first seal 30. A second seal (not shown) can if desired be provided in the sealing surface 34 of second side 32.

Shut-off valve 26 is adjustable over an adjustment range V, for which purpose a spindle is applied in the shown embodiment which is rotatably drivable in a rotation direction R via an electronic controller 40 and an electric motor, more particularly a stepping motor (not shown). The construction further comprises a spring 44.

The adjustment range V is bounded by two extreme positions. In the first extreme position (FIGS. 2 and 3A) of adjustment range V of shut-off valve 26 the first sealing side 28 of shut-off valve 26 lies against the wall of branching chamber 18 and closes off third channel 24 from branching chamber 18.

In the second extreme position (FIG. 3C) of adjustment range V of shut-off valve 26 the second sealing side 32 of shut-off valve 26 lies against the wall of branching chamber 18 and closes off first channel 20 from branching chamber 18. The supply of fluid via first channel 20 to branching chamber 18 is hereby prevented, or at the very least greatly reduced. The flow F of fluid is indicated with arrows in FIGS. 3A-3C.

Figure 3A:
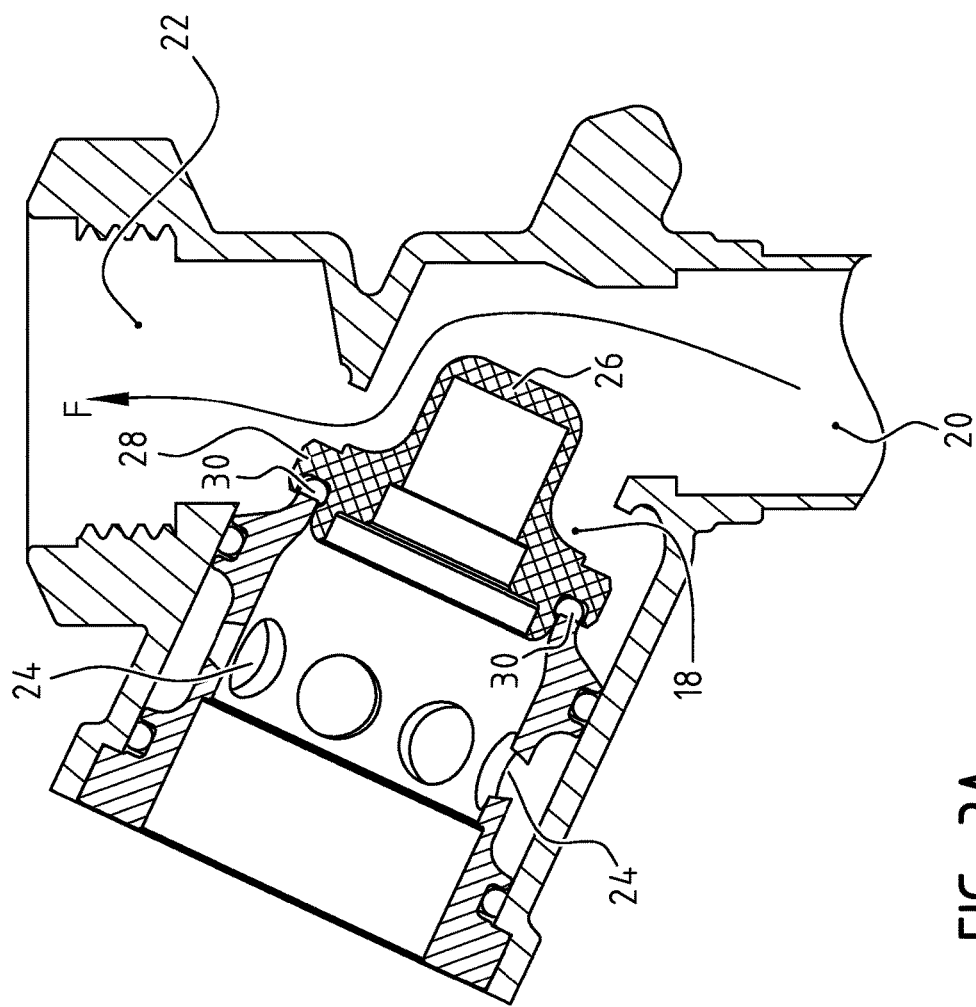
FIGS. 3A-3C are schematic views of respectively the first extreme position of FIG. 2, an intermediate position and a second extreme position.
Figure 3B:
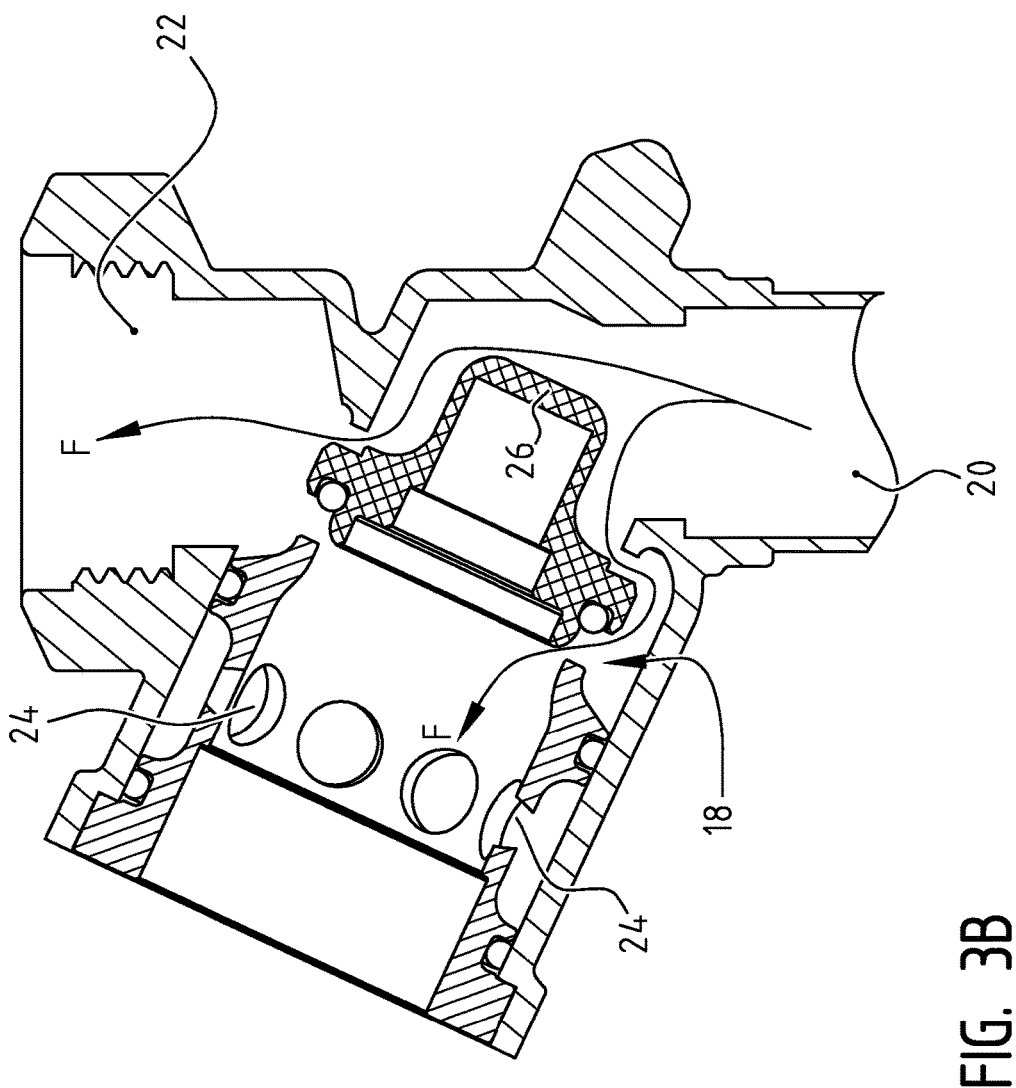

FIG. 3B shows an intermediate position located between the two extreme positions which divides the adjustment range into a first part and a second part. In the intermediate position shown in FIG. 3B the fluid supplied via first channel 20 is divided over second channel 22 and third channel 24.

Figure 3C:
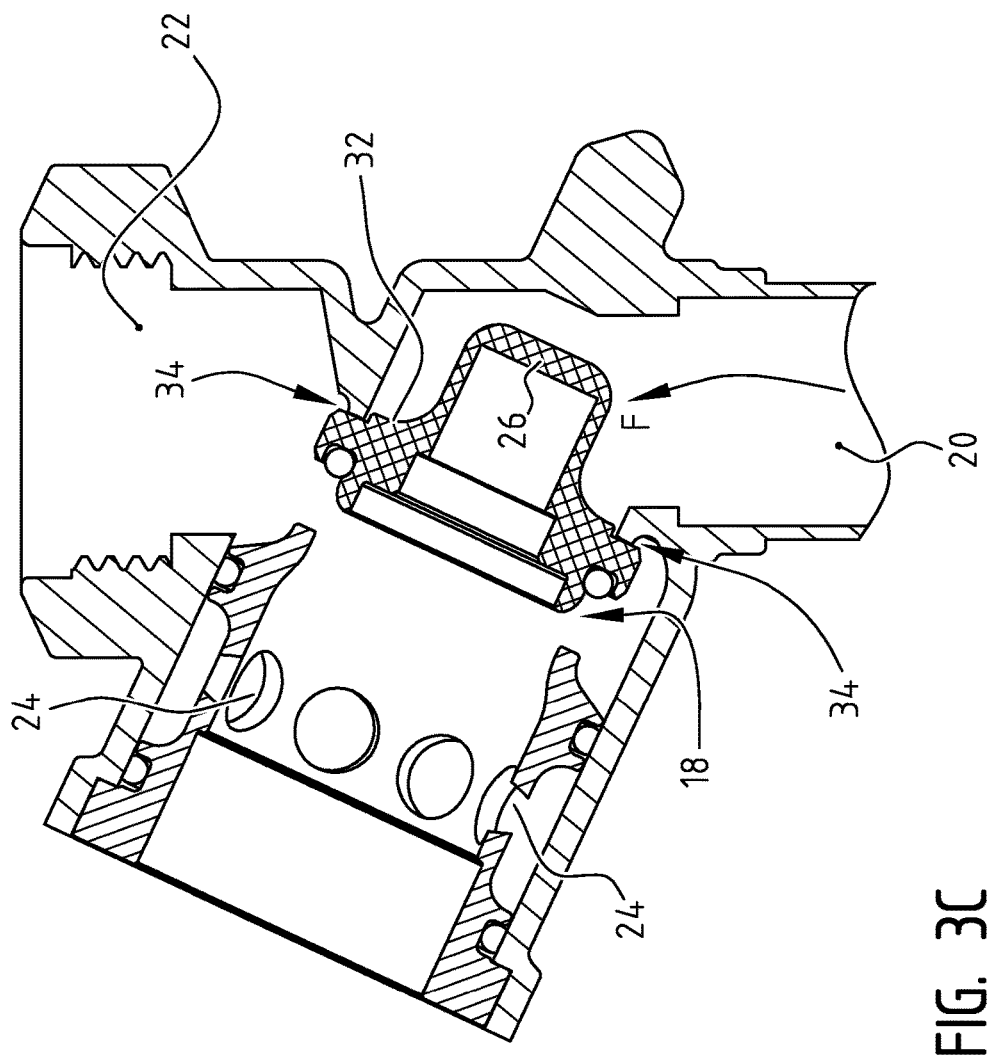

Movement through the first part of the adjustment range takes place from the second extreme position (FIG. 3C) in the direction of the first extreme position (FIG. 3A) and into the intermediate position shown in FIG. 3B. Movement through the second part of the adjustment range takes place from the intermediate position shown in FIG. 3B in the direction of the first extreme position (FIG. 3A). FIG. 3C shows a situation in which no flow is taking place, and thereby forms a rest position, which is for instance utilized to temporarily uncouple a hot water appliance 2 from a parallel circuit with a plurality of hot water appliances.

When shut-off valve 26 moves through the first part of the adjustment range (i.e. from FIG. 3C to FIG. 3B), first channel 20, second channel 22 and third channel 24 are brought into flow connection with each other and their relative flow via branching chamber 18 over the adjustment range away from the second extreme position (FIG. 3C) is increased. The flow between first channel 20 and second channel 22 can hereby be controlled, and can be reduced, or 'constricted', as required. A sub-flow of fluid increasing in volume also runs at the same time via branching chamber 18 to third channel 24.

When shut-off valve 26 moves through the second part of the adjustment range (i.e. from FIG. 3B to FIG. 3A), first channel 20, second channel 22 and third channel 24 are in flow connection with each other via branching chamber 18 and the flow between first channel 20 and second channel 22 is further increased over the further adjustment range in the direction of the first extreme position while the flow via branching chamber 18 between first channel 20 and third channel 24 over the further adjustment range in the direction of the first extreme position (FIG. 3A) is reduced. The flow between first channel 20 and second channel 22 can hereby be further controlled, while on the other hand the flow of fluid from branching chamber 18 to third channel 24 in the second part of the adjustment range can be reduced and even fully closed off.

Now that it is clear how flow controller 1 operates, it is noted that the internal volume of bypass conduit 10 is an important parameter for the application of such a flow controller 1 in a hot water appliance 2 (FIG. 1). The length and the diameter can be adapted such that the internal volume of bypass conduit 10 between flow controller 1 and outlet channel 8 of heat exchanger 4 is such that a cold flow of water comes together optimally with an (excessively) hot water flow from heat exchanger 4 so that these water flows can mix and the temperature thereof can be effectively reduced so as to at least prevent the danger of being burned.

Figure 4:
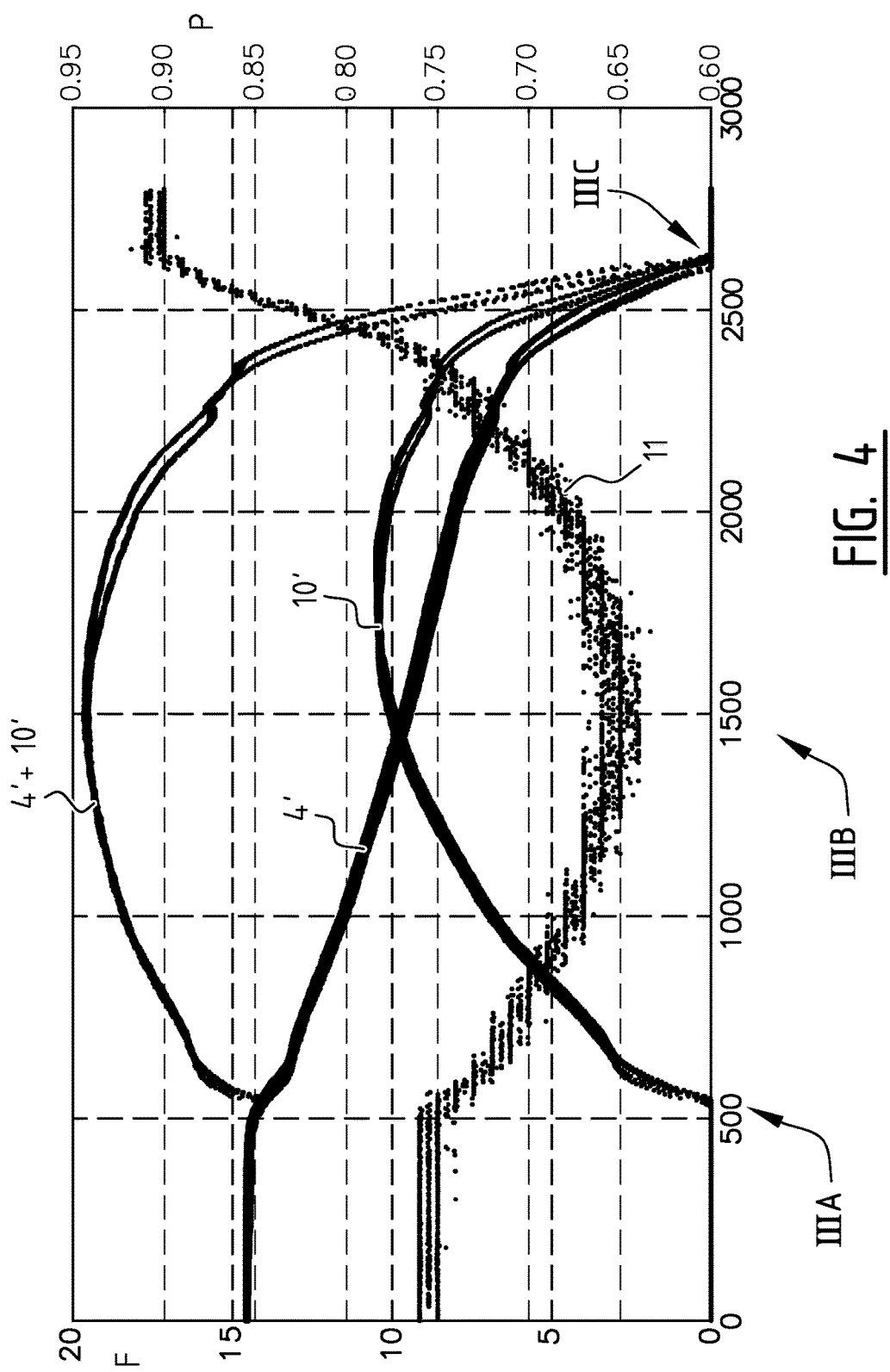
FIG. 4 shows a diagram which plots the flows through the different channels against the position of the shut-off valve.

Finally, FIG. 4 shows the flow through the different channels in a graph. The flow 4' through heat exchanger 4 is the flow which runs via second channel 22, while the flow 10' through bypass channel 10 corresponds to the flow through third channel 24. The situations associated with FIGS. 3A, 3B and 3C are designated in the graph with references IIIA, IIIB and IIIC. The throughflow F in liters per minute is plotted along the left vertical axis. The horizontal axis indicates the valve setting in steps and the pre-pressure P is plotted in bar along the right vertical axis.

In the situation of FIG. 3C (see IIIC in FIG. 4) there is no flow F and, when shut-off valve 26 is moved in the direction of the situation shown in FIG. 3B, the flow F through second channel 22 (flow curve 4') and flow F through third channel 24 (flow curve 10') both increase.

In the situation of FIG. 3B (see IIIB in FIG. 4) the flow F through second channel 22 (flow curve 4') and flow F through third channel 24 (flow curve 10') are substantially equal, i.e. the fluid supplied via first channel 20 is divided substantially equally.

When the shut-off valve moves further to the situation of FIG. 3A (see IIIA in FIG. 4), the outflow of third channel 24 is closed off more and more until no further flow F takes place through third channel 24 (flow curve 10'). All the fluid supplied through first channel 20 will flow via branching chamber 18 to second channel 22 (flow curve 4').

Also shown in FIG. 4 is the pre-pressure (curve 11) of the fluid, for instance of a water mains system. It can clearly be seen that in the fully closed situation of FIG. 3C (see IIIC in FIG. 4; throughflow F is zero) the pre-pressure is at a maximum. In order to reduce the load on shut-off valve 26 it is possible to opt to allow a leakage flow, this resulting in a reduction of the pre-pressure.

Plotted on the horizontal axis of FIG. 4 are the steps of a stepping motor. In the shown example the stepping motor has 2600 steps, whereby a precise control is possible. Such a precise control is particularly important for the bypass function, i.e. the flow through bypass channel 10. In order to obtain a precise control the geometry is designed such that from IIIC to IIIA the first 2000 steps of the stepping motor (i.e. the steps from 2600 to 600 in FIG. 4) control the flow 10' through bypass channel 10.

Although it shows a preferred embodiment of the invention, the above described embodiment is intended only to illustrate the present invention and not to limit the specification of the invention in any way. When measures in the claims are followed by reference numerals, such reference numerals serve only to contribute toward the understanding of the claims, but are in no way limitative of the scope of protection. The described rights are defined by the following claims, within the scope of which many modifications can be envisaged.

The invention claimed is:

1. A hot tap water appliance for delivering hot tap water to a user, comprising:
   a heater with an inlet channel connected to a cold tap water feed for tap water to be heated and an outlet channel with which hot tap water is discharged, wherein the heater is configured to heat cold tap water supplied via the cold tap water feed;
   a flow controller, comprising;
      a housing comprising at least three channels; and
      a branching chamber disposed in the housing and in which the at least three channels debouch;
      wherein a shut-off valve with which two of the three channels can be closed and at least two of the three channels can be left clear being arranged in said branching chamber; and
      wherein the shut-off valve has an adjustment range (V) with a first extreme position in which a first channel, that is a cold tap water feed channel, and a second channel, that is a first cold tap water discharge channel which is in flow connection with the inlet channel of the heater, of the at least three channels are in flow connection with each other via the branching chamber and in which the first channel and a third channel, that is a second cold tap water discharge channel which is in flow connection with the bypass channel, of the at least three channels are closed off from each other;
   a bypass channel that is in flow connection from the inlet channel to the outlet channel of the heater so that, depending on a position of the shut-off valve in the branching chamber of the flow controller, heated tap water from the outlet channel of the heater and cold tap water directed from the cold tap water feed through the bypass channel is mixable and dischargeable in a mixed state via a water outflow of the hot tap water appliance;
   at least one temperature sensor close to a hot water side of the heater, in a flow direction before a connection of the bypass channel to the outlet channel, for determining the temperature of the hot tap water leaving the heater; and a controller configured to drive the shut-off valve subject to the hot tap water temperature detected with the at least one temperature sensor.

2. The hot tap water appliance according to claim 1, wherein the shut-off valve lies in the first extreme position against the wall of the branching chamber and closes off the third channel from the branching chamber, while a fluid can flow via the branching chamber from the first channel to the second channel.

3. The hot tap water appliance according to claim 1, wherein the shut-off valve comprises two sealing sides, wherein:
in the first extreme position of the adjustment range of the shut-off valve a first sealing side of the shut-off valve closes off the third channel from the branching chamber; and
in a second extreme position of the adjustment range of the shut-off valve a second sealing side of the shut-off valve closes off the first channel from the branching chamber, whereby a supply of fluid via the first channel to the branching chamber is blocked.

4. The hot tap water appliance according to claim 3, wherein the first channel is closable in the second extreme position of the adjustment range of the shut-off valve.

5. The hot tap water appliance according to claim 4, wherein the shut-off valve moves in the branching chamber between the first and second extreme positions substantially transversely of an outflow of the second channel, and this outflow of the second channel into the branching chamber is left clear by the shut-off valve.

6. The hot tap water appliance according to claim 1, wherein the first, second and third channels are brought into flow connection with each other over a first part of the adjustment range during movement thereover from a second extreme position in the direction of the first extreme position, and their relative flow via the branching chamber is increased over the adjustment range away from the second extreme position.

7. The hot tap water appliance according to claim 6, wherein the first, second and third channels are in flow connection with each other over a second part of the adjustment range and the throughflow via the branching chamber between the first and the second channel is further increased over the further adjustment range in the direction of the first extreme position, while the throughflow via the branching chamber between the first and the third channel is decreased over the further adjustment range in the direction of the first extreme position.

8. The hot tap water appliance according to claim 6, wherein the transition between the first part of the adjustment range and the second part of the adjustment range lies in the range of 35%-65% of the adjustment range of the shut-off valve.

9. The hot tap water appliance according to claim 8, wherein the transition between the first part of the adjustment range and the second part of the adjustment range divides the volume flow from the first channel substantially proportionally over the second and the third channel.

10. The hot tap water appliance according to claim 1, wherein the shut-off valve is adjustable via a drivable screw spindle.

11. The hot tap water appliance according to claim 1, wherein the shut-off valve is manufactured from a corrosion-resistant metal.

12. The hot tap water appliance according to claim 1, wherein the controller is electronic and configured to drive the shut-off valve subject to the hot tap water temperature using a drive means.

13. A method of delivering hot tap water to a user, comprising the successive steps of:
supplying cold tap water to a cold tap water feed channel of a shut-off valve;
supplying cold tap water to an inlet channel of a heater via a cold tap water discharge channel of the shut-off valve;
heating the cold tap water in the heater and outputting hot tap water via an outlet channel of the heater;
providing, via a second cold tap water discharge channel of the shut-off valve, cold tap water to a bypass channel based on a water temperature of the hot tap water;
adding the bypassed cold tap water from the bypass channel to the hot tap water from the outlet channel of the heater; and
discharging the mixed hot and cold tap water via a hot water discharge.

14. The method of claim 13, wherein the step of bypassing cold tap water is selectively performed based on the water temperature of the hot tap water.

15. The method of claim 14, wherein the water temperature of the hot tap water is sensed using a temperature sensor, and the step of adding the bypassed cold tap water to the hot tap water is performed using a flow controller.

16. The method of claim 15, wherein adding the bypassed cold tap water to the hot tap water is performed using an electronic controller to control a shut-off valve in the flow controller subject to the temperature sensed by the temperature sensor.

17. The method of claim 13, wherein the step of adding the bypassed cold tap water to the hot tap water is automatically performed using a flow controller.

18. The method of claim 17, wherein an electronic controller controls the flow controller for adding the bypassed cold tap water to the hot tap water based on a water temperature of the hot tap water, wherein the water temperature of the hot tap water is sensed using a temperature sensor.

* * * * *